Aug. 25, 1970 H. RINDERLE 3,525,943

DEMODULATOR WITH LIMITING PROPERTIES FOR FREQUENCY MODULATED OSCILLATIONS

Filed Sept. 12, 1967 3 Sheets-Sheet 1

Inventor:
Heinz Rinderle
By: Spencer & Kaye
Attorneys

Aug. 25, 1970 H. RINDERLE 3,525,943

DEMODULATOR WITH LIMITING PROPERTIES FOR FREQUENCY MODULATED OSCILLATIONS

Filed Sept. 12, 1967 3 Sheets-Sheet 2

Inventor:

Heinz Rinderle

By: Spencer & Kaye

Attorneys

Inventor:
Heinz Rinderle
By: Spencer & Kaye
Attorneys

United States Patent Office 3,525,943
Patented Aug. 25, 1970

3,525,943

DEMODULATOR WITH LIMITING PROPERTIES FOR FREQUENCY MODULATED OSCILLATIONS

Heinz Rinderle, Heilbronn, Germany, assignor to Telefunken Patentverwertungsgesellschaft m.b.H., Ulm (Danube), Germany Filed Sept. 12, 1967, Ser. No. 667,174
Claims priority, application Germany, Oct. 7, 1966, T 32,222
Int. Cl. H03d 3/10, 3/24
U.S. Cl. 329—130 4 Claims

ABSTRACT OF THE DISCLOSURE

A demodulator with limiting properties for frequency-modulated oscillations in which two synchronous diodes are connected directly together in series so as to conduct in the same direction. This pair of diodes is connected in parallel to one of two coupled-together resonant circuits. The middle point of this resonant circuit and the connection point between the two diodes are connected in series between a high-frequency input and a low frequency output. Between the low frequency output and the high frequency input, and usually between the low frequency output and the diodes, a resistor is inserted in series; this resistor is so dimensioned that the low frequency voltage is practically independent of the level of the input voltage. The resonant resistance of the circuit to which the diodes are connected is dimensioned so as to be so small that no special diodes need be required, but so that diodes with normal inherent capacitance can be used.

BACKGROUND OF THE INVENTION

For the demodulation and limiting of frequency modulated oscillations there is usually used a ratio-detector. This consists in the main of two resonant circuits coupled together, and two diodes connected in series with each other in the same direction in regard to A.C. current, this pair of diodes connected in parallel to the secondary circuit. Between the two diodes there is a charging condenser, usually an electrolytic condenser, bridged over by an ohmic resistance. On the charging condenser there appears a D.C. voltage obtained from the demodulation. This D.C. voltage corresponds to the carrier amplitude, and acts as bias voltage for the diodes. The amplitude limitation derives from an amplitude dependent damping of the secondary circuit by the diodes.

There is alos known an FM demodulator with limiting properties which is of simpler construction than the ratio detector. This FM demodulator is shown in FIG. 1 and contains no charging condenser, no resistance through which passes the rectified current of the diodes, and few other condensers. This economy is obtained by connecting the two diodes 4, 5 together directly, rather than over a condenser. In this way the bias voltage on the charging condenser is replaced by the voltage drop across the diodes in the forward direction. For this reason the demodulator operates only in the presence of small amplitudes, for example on a low frequency voltage of 87.5 mv. The two resonant circuits 1 and 2, which are coupled together, and the tertiary coil 3 are the same as in the ratio detector. Furthermore their dimensions are the same, because the secondary resonant circuit must have a relatively high ohmic resistance (a large secondary circuit inductance, for example two times ten windings) to ensure that the diodes sufficiently modify the damping of the secondary circuit. The current circuit of the tertiary coil 3 is completed via the condenser 6 of 820 pf. From this condenser 6 the low frequency voltage LF is taken off via the RC member, which consists of the resistance 7 of 1KΩ and the condenser 8 of 220 pf.

However, this already known simplified FM demodulator as represented in FIG. 1 operates satisfactorily only if it contains special diodes of very small capacities and steep flux characteristic curves. If normal diodes are used signal amplitude dependent fluctuations in the diode capacity causes disturbing mistuning of the secondary oscillation curve, and this causes a pronounced signal level dependent shifting of the crossover frequency of the demodulator characteristic line. In the presence of noise modulation there results a low frequency noise voltage on the output terminal. Although in the usual kind of ratio detector using normal diodes mistuning of the secondary circuit does occur, impairing the amplitude limitation, it is known that this effect can be compensated by using series resistances in the two diode rectified current branches. In many cases one of these two series resistances is made variable, and is adjusted in practice to give the best AM noise suppression. But, in the simplified FM demodulator mentioned above no provision is made for compensating the noise effect by the method used in ratio detectors, and in fact this compensation is not possible. Consequently, in the known simplified FM demodulator there must be used diodes of very small capacities, so as to keep the disturbing effects mentioned above within tolerable limits.

A further disadvantage of the already known simplified FM demodulator arises during large signals, when the diodes impose a heavy load on the tertiary circuit. Under these circumstances the phase of the A.C. voltage taken from the tertiary coil becomes shifted relative to the phase of the primary circuit voltage. This effect is caused by the unavoidable stray coupling between the primary circuit and the tertiary circuit coils. This impairs the noise suppression in the same kind of way as does a mistuning of the secondary oscillation circuit by the diodes.

Starting out from the simplified FM demodulator described above and represented in FIG. 1, the object of the present invention is to modify this, without disadvantages, in such a way that normal diodes can be used, in particular the usual, inexpensive, germanium point contact diodes, even though these diodes tend to produce large amplitude dependent capacity fluctuations, due to their larger capacities.

SUMMARY OF THE INVENTION

The invention therefore relates to a demodulator having limiting properties for frequency modulated oscillations, in which two diodes are circuited in series in the same direction without any interposed ohmic resistance, the pair of diodes circulated in parallel to one of two resonant circuits which are coupled together, and in which between the middle point of this resonant circuit and the connection point between the two diodes there are connected in series an A.C. voltage derived in phase or in opposed phase from the other resonant circuit, for example over a tertiary coil, and the obtained low frequency voltage. According to the invention there is circuited in series with the A.C. voltage and the low frequency voltage a non-reactive, or almost non-reactive, resistance so dimensioned that over a large received voltage range the low frequency voltage is practically independent of the received voltage, and the resonant circuit to which the diodes, particularly semi-conductor diodes, are connected has such a low resistance that diodes of normal self-capacity can be used.

Thus in contrast to the previously known simplified FM demodulator, the resistance is in the high frequency or intermediate frequency current circuit itself (resistance 9 in FIGS. 2–10), whereas in the previously known circuit represented in FIG. 1 the resistance 7 is situated outside this current circuit, and consequently acts merely as a filtering resistance for the high frequencies. In the circuit according to the invention this function is still performed by the resistance, but its main purpose is to perform the task mentioned above, as will be described in greater detail further below on the basis of FIG. 2.

The demodulator according to the invention has this in common with the previously known demodulator represented in FIG. 1, that there is no electrolytic condenser and consequently the demodulator can be integrated.

If the two diodes are on the secondary side of the two resonant circuits, which are coupled together, it is preferable to couple in the tertiary circuit, and thus to couple in the diodes, to the primary circuit in such a degree that no collector voltage limitation occurs in the transistor which feeds the primary circuit. A collector voltage limitation of this kind is undesirable because the accompanying pronounced variations in the output capacity of the transistor, and the marked reduction in the output end internal resistance of the transistor, cause a strong mistuning of the primary resonant circuit, and this naturally results in a high degree of distortion in the signal on the primary oscillation circuit. By choosing a suitable transformation ratio between the tertiary coil and the primary coil it is possible to obtain a load impedance on the transistor which is so small that no serious collector voltage limitation occurs, because in the presence of large signals the resistance (9 in FIGS. 2–10), introduced according to the invention, itself almost entirely determines the load on the primary resonant circuit. This method of limiting the load on the primary resonant circuit has the further advantage that a minimum selection of the primary oscillation circuit is retained.

BRIEF DESCRIPTION OF DRAWINGS

The invention will now be described in greater detail with the help of FIGS. 2–10. The figures show several circuit variations, all of which contain the basic inventive idea of introducing a resistance 9.

In order to prevent the undesired influence of circuit capacities, it is preferable to connect one end of the resistance 9 directly to the junction point between the two diodes (FIGS. 2–8 in contrast to FIGS. 9 and 10).

DETAILED DESCRIPTION OF DRAWINGS

Figure 1:
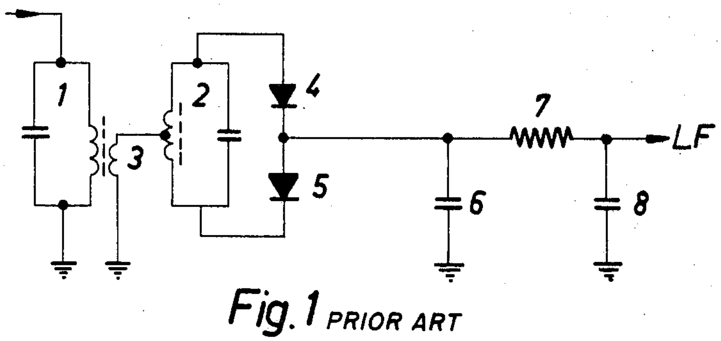
Fig. 1 PRIOR ART

In FIG .2 the left-hand part of the circuit, containing the reference numbers 1–5, agrees with the left-hand part of the circuit represented in FIG. 1. In the right-hand part of the circuit there is again the condenser 6 which completes the high frequency alternating current circuit, but in this case the circuit is not completed directly but rather via the ohmic resistance 9, which is connected to the connection between the two diodes 4 and 5. The filter 7, 8 shown in FIG. 1 is not necessary in the circuit of FIG. 2, because its function is already performed by the resistance 9 and the condenser 6. The resistance 9 circuited according to the invention functions as follows.

In FIGS. 2–10 the amplitude limitation does not derive only from an amplitude dependent damping of the secondary circuit by the diodes, as it does in the ratio detector and in the previously simplified FM demodulator represented in FIG. 1, but also derives (or derives exclusively) from an amplitude dependent division of the voltage on the tertiary coil 3 between the parallel circuited diodes 4 and 5, on the one hand, and the resistance 9 on the other hand. Thus in this case, in contrast to the ratio detector and the circuit of FIG. 1, amplitude limitation is not obtained only by the automatic change in the secondary voltage on the resonant circuit 2 caused by the amplitude dependent internal resistance of the diodes 4 and 5, but also by (or exclusively by) changing that part of the primary voltage (on the resonant circuit 1) which is effectve for the rectifying, and thus changing the effective part of the voltage on the tertiary coil 3. On this basis, in contrast to the ratio detector and to the already known demodulator of FIG. 1, a damping effect alone (or a damping effect) is no longer necessary, and consequently the secondary circuit can have a low ohmic resistance (higher capacity and lower inductance, for example two times five instead of two times ten turns), and as a result of this the damping effected by the diodes plays a lesser role (or no role at all) due to the low resonance resistance. Furthermore the higher resonant circuit capacity allows diodes of greater capacity to be used, without there resulting any undesirable high degree of mistuning. On the other hand, due to the alternating current loss on the resistance 9 it is advisable to dimension the tertiary coil 3 somewhat more generously (for example ten turns instead of three).

The resistance 9 is therefore so dimensioned that the corresponding amplitude dependent voltage division, together with the amplitude dependent damping variation of the secondary resonant circuit 2, compensates the influence of slow or rapid amplitude changes with respect to the demodulator output. The compensation of amplitude distortions is also promoted by the fact that in the presence of residual phase changes in the effective diode resistances, due to amplitude fluctuations, which cause a small amount of detuning of the secondary resonant circuit, there results at the same time a phase fluctuation in the voltage division, and this automatically decreases the undesired influence of the mistuning. The limiting process already begins to be effective at relatively low voltages (it becomes effective earlier than it does in the ratio detector), but becomes less effective in the presence of high signal voltages (in contrast to what takes place in the ratio detector). However this decrease in effectiveness is of no practical significance, because when the signal voltage is high the amplitudes fed to the demodulator are already limited in the preliminary amplifying stage. If the resistance 9 is non-reactive, or almost non-reactive, then due to the fact that the diode resistances are themselves almost non-reactive (in spite of the self-capacity mentioned above) the voltage dividing also occurs non-reactively, that is to say the phase relationship between the voltage on the secondary resonant circuit 2 and the divided tertiary voltage remains exactly or almost exactly 90° at the resonance frequency.

Figure 2:
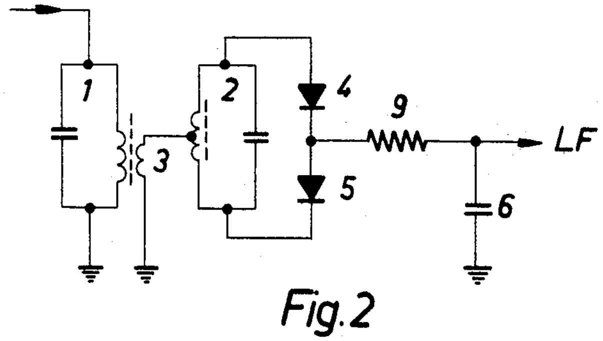
Figure 3:
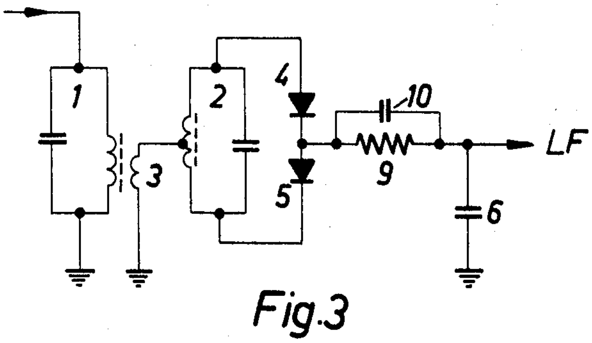

Investigations have shown that an increase in the distortion suppression and in the symmetrical behavior of the circuit can be obtained over a larger signal voltage range, by giving the resistance 9 a small amount of reactance (phase), for example by connecting in parallel with it a condenser 10, as shown in FIG. 3, whose capacitive resistance is larger compared to the ohmic resistance, or by suitably dimensioning the condenser 6 in FIGS. 2 and 5 to 10, which serves essentially only for leaking away the high frequency oscillations (capacitive resistance small compared to the ohmic resistance).

Figure 4:
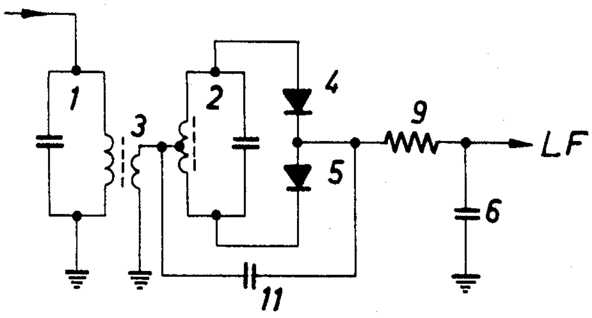

Moreover for the same purpose there can be used a condenser 11 as shown in FIG. 4, with a large capacitive resistance, introduced between the connection joining the two diodes 4 and 5 and the middle point of the secondary resonant circuit 2. This condenser 11 partly determines the phase of the voltage division in the tertiary circuit at small signal levels, because under these circumstances the resistance of the diodes is large.

Figure 5:
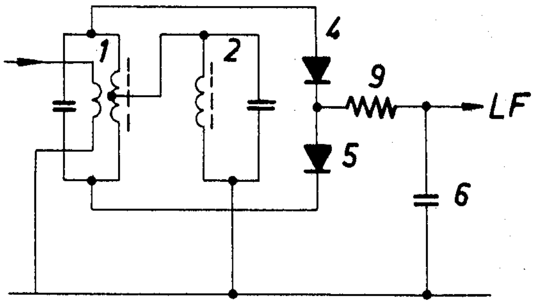

FIG. 5 shows an example in which the diodes 4 and 5 are not in the secondary circuit 2 but in the primary oscillation circuit 1. Here again the two resonant circuits are coupled together.

Figure 6:
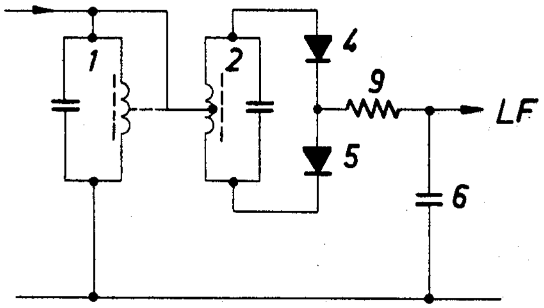

In FIGS. 6–10 the diodes are again in the resonant circuit 2. In the circuit of FIG. 6 the tertiary coil has been omitted in the known way, and the middle point of the oscillation circuit 2 is connected either to the upper terminal of the resonant circuit 1, or it is connected to the resonant circuit by means of a tap (as indicated by the broken line).

Figure 7:
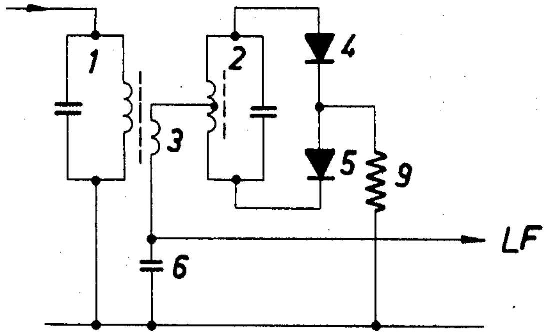

The circuit shown in FIG. 7 differs from that of FIG. 2 only by the fact that the other pole of the condenser 6 is grounded. The low frequency voltage LF is however again taken from the non-grounded end of the condenser 6, and in FIG. 7 this condenser is connected to the tertiary coil 3.

Figure 8:
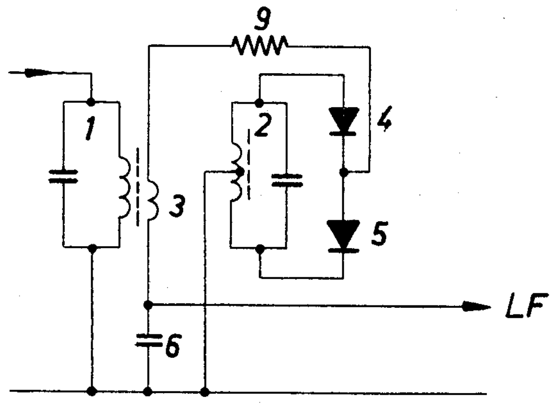

In FIG. 8 the sequence of the tertiary coil 3 and the condenser 6 is reversed compared to FIG. 2. The low fequency voltage LF is taken off as in FIG. 7.

Figure 9:
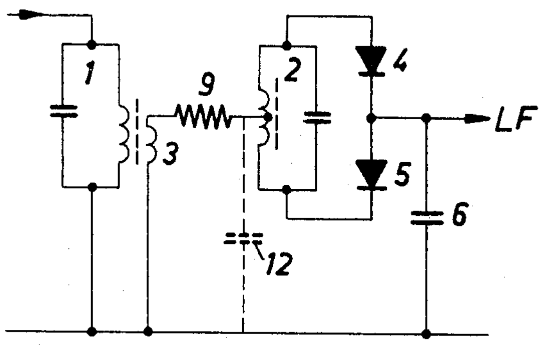
Figure 10:
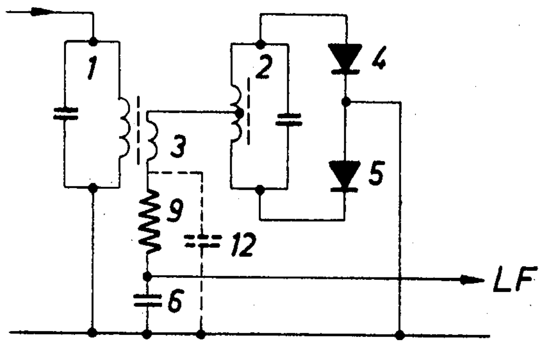

In FIGS. 9 and 10 the resistance 9 is at yet another location in the high frequency circuit, but this does not essentially change its method of functioning. In these circuits it should however be given attention that the capacities resulting from the construction of the circuit (the sum of these is represented by the condenser 12 shown in broken line) give rise to an uncontrollable phase change in the divided tertiary voltage (by means of the resistance 9) compared to the phase of the primary voltage. Unless other advantages of these two circuits are regarded as important, it is preferable to use the circuit of FIGS. 2–8, in which the resistance 9 is connected at one end directly to the connection joining the two diodes together, this arrangement allowing only a small part of the structural capacities mentioned above to be effective.

I claim:

1. Demodulator according to claim 3, characterized in that the one end of the ohmic resistor means (9) is connected directly to the connection point between the two diodes 4, 5 (FIGS. 2–8).

2. Demodulator according to claim 3 characterized in that the ohmic resistor means is directly connected to the middle point of the one resonant circuit means.

3. In a demodulator with limiting properties for frequency modulated oscillations for obtaining a low frequency voltage, the combination which comprises: two diodes connected directly together in series and poled in the same direction, with a connection point between said diodes; two resonant circuit means which are coupled together, said pair of diodes being connected in parallel to one of said two resonant circuit means; A.C. voltage input means connected to one of said two resonant circuit means, low frequency output means connected to one of said resonant circuit means; and ohmic resistor means connected in series with said low frequency output means, said resistor means having a value such that over a large received voltage range said low frequency voltage is practically independent of said received voltage, and the resonant circuit means to which said diodes are connected being dimensioned such that said two diodes may be constituted by diodes having normal self capacity.

4. Demodulator according to claim 3, further comprising a tertiary coil, said ohmic resistor means being connected to the middle point of the one resonant circuit means by means of said tertiary coil.

References Cited

UNITED STATES PATENTS

| | | | |
|---|---|---|---|
| 2,591,917 | 4/1952 | Cluwen | 329—138 |
| 2,620,439 | 12/1952 | Dome | 329—133 X |
| 2,904,675 | 9/1959 | Janssen et al. | 329—138 X |
| 3,383,607 | 5/1968 | Avins | 329—130 X |

ALFRED L. BRODY, Primary Examiner

U.S. Cl. X.R.

329—137, 133; 307—233, 215